May 16, 1933.　　　J. A. BUQUOR　　　1,909,655
FILTER
Filed Jan. 20, 1932
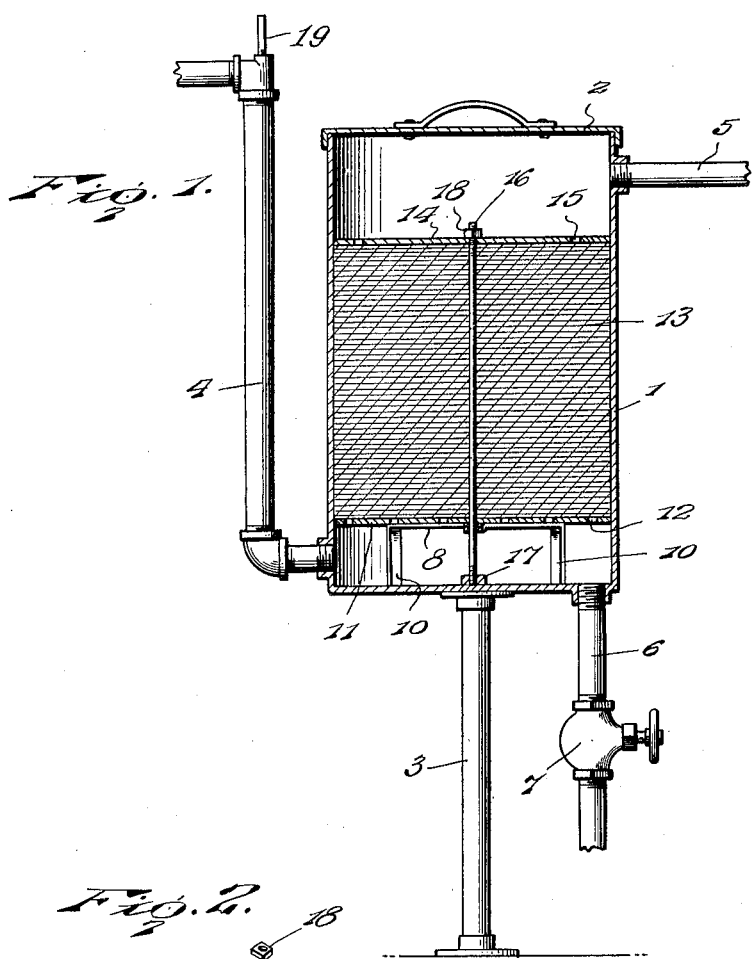
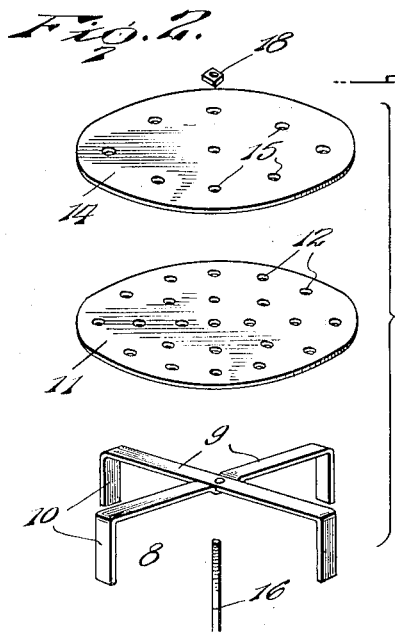
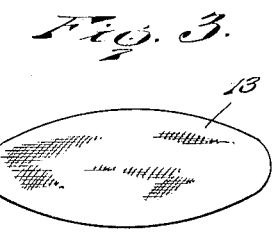
Inventor
J. A. Buquor.
By Lacey & Lacey,
Attorneys Patented May 16, 1933

1,909,655

UNITED STATES PATENT OFFICE

JOHN A. BUQUOR, OF SARASOTA, FLORIDA

FILTER

Application filed January 20, 1932. Serial No. 587,798.

This invention relates to apparatus for clarifying and reclaiming gasoline and other solvents which are used in dry cleaning fabrics, clothing and other articles. In the dry cleaning process, gasoline or other solvent is agitated with the fabrics to be cleaned within a suitable vessel and removes the dirt from the soiled fabrics, the solvent being withdrawn from the vessel and carrying the removed dirt and other matter with it. The dirty solvent is then treated so as to remove the impurities and be clarified and is then returned to the agitating vessel for further use. The clarifying process involves carrying the dirty solvent through a series of vessels successively until it is entirely freed of water and dirt so that it is again clear and free from impurities and ill-smelling odors. The present invention has for its object the provision of a filter of novel and efficient construction through which the solvent is passed in the last stage of its clarification, the invention providing a device which is inexpensive and will be automatic in its operation so as to require little, if any, attention and which will effectually remove from the solvent the remaining impurities, extraneous moisture and disagreeable odors. The invention is illustrated in the accompanying drawing and will be hereinafter fully set forth and defined.

In the drawing,

Figure 1 is a view, partly in elevation and partly in vertical section, of a filter constructed in accordance with the invention, Fig. 2 is a perspective view showing parts of the filter separated but in their proper relation, Fig. 3 is a detail view illustrating a filter cloth.

The filter comprises a preferably cylindrical receptacle 1 having a removable top 2 and is shown as mounted upon the upper end of a post 3. The solvent to be filtered is brought into the filter through a pipe 4 which is connected with the receptacle or container 1, at the bottom thereof, as clearly shown, and the filtered solvent is carried from the filter through a pipe 5 which leads from the receptacle, at the upper end of the same. A drain pipe 6 having a cut off valve 7 therein is connected with the bottom of the receptacle, as shown.

Resting upon the bottom of the receptacle is a frame 8 consisting of radial members 9 provided at their ends with depending feet 10 adapted to rest upon the bottom of the casing, as shown. The radial members 9 may be all formed in one integral structure but are illustrated as consisting of cross bars intersecting at their centers, this construction being preferred merely as a matter of convenience in fitting the parts together and facilitating cleaning and repairs when necessary. Resting upon the frame 8 is a disk 11 which is of such diameter as to fit closely within the receptacle 1 and this disk 11 is provided with perforations 12 extending throughout its area so that the incoming solvent may rise through the plate to pass through the filtering body disposed above the plate. The filtering body 13 is formed of cotton or other suitable material which will have an affinity for water and will entrap such impurities as may remain in the solvent when it enters the filter. The filtering body may consist of fabric sheets, illustrated in Fig. 3 as of a circular formation so as to fit closely within the filter body but the exact form of the material is unimportant, provided it be furnished in sufficient quantity to entirely and closely fill the space between the perforated disk 11 and the upper disk 14 which is disposed within the filter body below the outlet 5. The upper disk 14 rests directly upon the filtering body and is provided with perforations 15 therethrough so that the purified and filtered solvent may escape. The disks 11 and 14 and the frame 8 are provided centrally with openings through which a clamping rod 16 is inserted upwardly, the extremities of said rod being threaded and its lower end being secured in a boss 17 on the bottom of the receptacle 1. A nut 18 is mounted on the upper threaded extremity of the clamping rod and is adapted to be turned home against the upper disk 14 so that when the nut is fully turned home the filtering body will be compressed or packed and firmly clamped between the upper and lower disks and tightly sealed against the wall of the container while the entire assemblage will be scarcely fastened.

It will be understood, from what has been said, that the solvent which has been washed and partly filtered is admitted to the bottom of the receptacle 1, below the perforated disk 11, and will rise through said disk and through the filtering body to escape through the perforations 15 of the upper disk 14 and eventually pass out through the outlet pipe 5 which conveys the reclaimed solvent to the original point of use. The inlet pipe 4 is provided with a vent pipe 19, as shown. This vent forms a visible signal to indicate the moistened condition of said body of material, as will appear from the following. In operation, as has been previously mentioned, the filtering body 13 is initially in a tightly packed condition and may be produced in some instances by tightly packing fabric cotton cloths on the plate 8 within the container and applying the top plate 14 which is screwed down tight by means of the nut 18. The material is immune to swelling in the presence of solvent but is highly sensitive to moisture and swells rapidly in the presence thereof. Consequently the body of filtering material will separate the moisture from the solvent as the solvent flows unobstructed through said body of material and will swell when dampened by moisture. This swelling increases the initial compactness of the body of material to such an extent as to largely cut off the flow of solvent so that the flow, in practice will be greatly reduced before the increasing pressure, caused by the swelling of the material, is sufficient to squeeze the moisture from the material back into the solvent. This procedure is quite noticeable in practice so that the operator will have ample warning that the material needs to be removed and renovated to dry it out whereupon it can again be used. However, the above mentioned vent pipe 19, in practice also forms a visible signal that indicates the moistened condition of the body of filtering material 13 since, as is obvious, as the material swells when dampened by moisture and increases the compactness of the material, the flow of solvent will be checked, as above described, and this checking of the flow will cause the solvent to back up in the inlet pipe and flow out the vent pipe to thereby indicate the moistened condition of the body of fabric filtering material. The device is exceedingly simple and inexpensive and has been found highly efficient in use. The apparatus needs little, if any, attention as there are no parts which are apt to get out of order and the elements which perform the actual filtering operation are all enclosed and protected against chance blows so that damage is avoided and, barring accidents, the apparatus may be used for a long period without requiring any renewals or other attention. When the apparatus is in continuous use, it may be necessary, at long intervals, to renovate or renew the filtering body or to clean the interior of the container and this work is facilitated because the cover 2 is readily removable and access is thereby obtained to the nut 18, removal of this nut permitting the separation and removal of such other parts as may be necessary, or the entire filtering unit may be removed from the body for subsequent detailed separation and examination.

Having thus described the invention, I claim,

1. A filter for dry cleaning solvent including a container having an inlet for the solvent to be filtered and an outlet for the filtered solvent whereby the solvent will flow through the container by gravity, a fabric filtering agent packed in the container to form a body of tightly packed filtering material between the inlet and outlet having a tight seal with the wall of the container, and means rigidly retaining said body of filtering material in its tightly packed condition, said body of filtering material being substantially immune to swelling in the presence of the solvent but sensitive to moisture and adapted to swell rapidly in the presence thereof whereby said body of filtering material will separate moisture from the solvent as the solvent flows through said body of material and will swell when dampened by moisture to increase the compactness of the body of material and largely cut off the flow of solvent therethrough to prevent squeezing by the swelling of the body of moisture from the body into the solvent to be forced through the body with the solvent to the outlet.

2. A filter for dry cleaning solvent including a container having an inlet pipe for the solvent to be filtered and an outlet pipe for the filtered solvent whereby the solvent will flow through the container by gravity, a vent on the inlet pipe, a fabric filtering agent packed in the container to form a body of tightly packed filtering material between the inlet and outlet having a tight seal with the wall of the container, and means rigidly retaining said body of filtering material in its tightly packed condition, said body of filtering material being substantially immune to swelling in the presence of the solvent but sensitive to moisture and adapted to swell rapidly in the presence thereof whereby said body of filtering material will separate moisture from the solvent as the solvent flows through said body of material and will swell when dampened by moisture to increase the compactness of the body of material and check the flow of solvent therethrough to cause the solvent to back up in said inlet pipe and flow out the vent to thereby indicate the moistened condition of said body of material.

In testimony whereof I affix my signature.

JOHN A. BUQUOR.